Jan. 14, 1930. A. WEILAND 1,743,174
SHACKLE
Filed Nov. 3, 1927 2 Sheets-Sheet 1

INVENTOR:
Alfred Weiland,
BY Robert M. Barr,
ATTORNEY.

Jan. 14, 1930.  A. WEILAND  1,743,174
SHACKLE
Filed Nov. 3, 1927   2 Sheets-Sheet 2
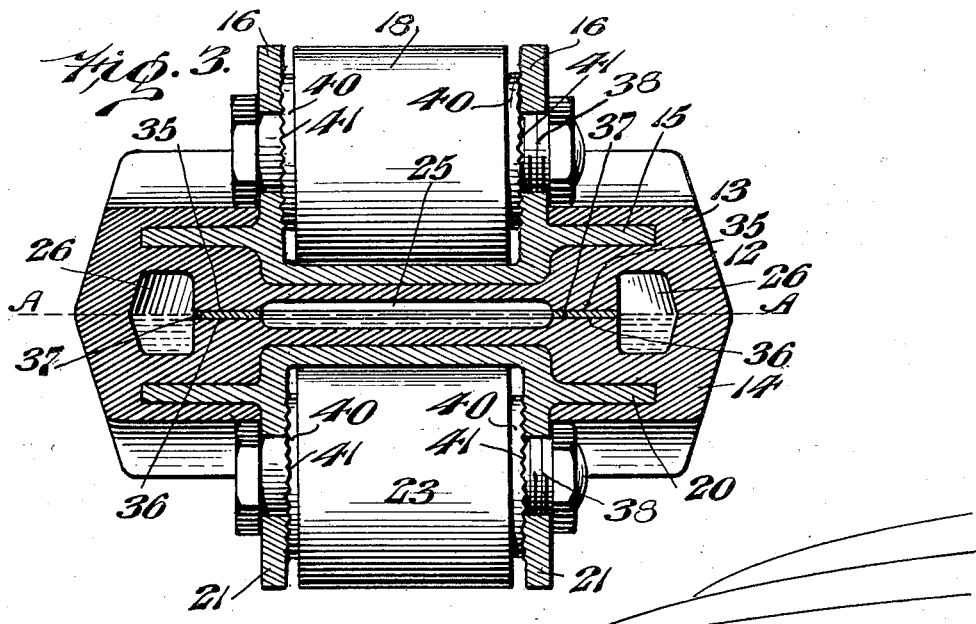
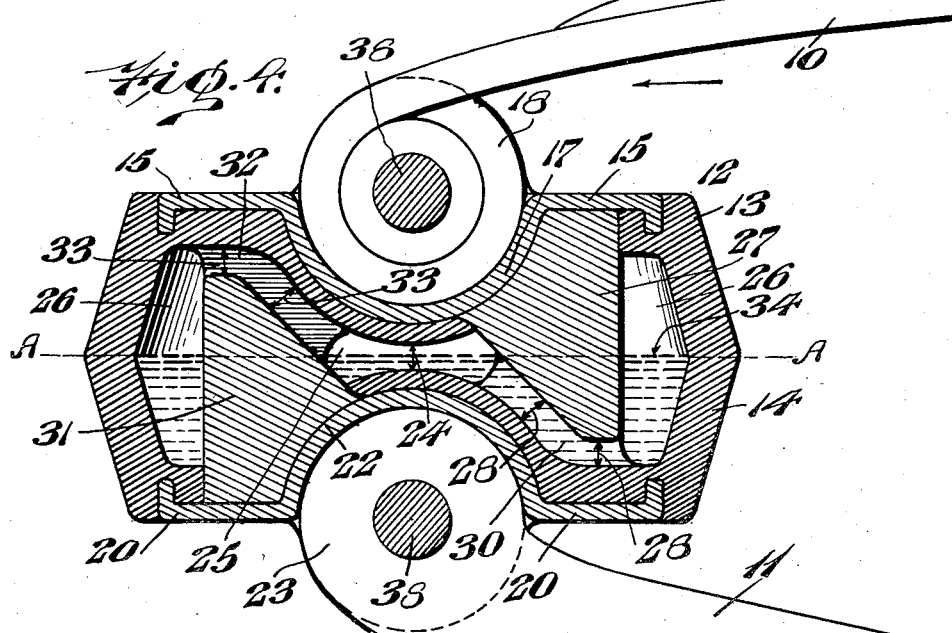
INVENTOR:
Alfred Weiland,
BY Robert M. Barr
ATTORNEY.

Patented Jan. 14, 1930

1,743,174

UNITED STATES PATENT OFFICE

ALFRED WEILAND, OF NESHANIC, NEW JERSEY, ASSIGNOR TO PNEUMATIC APPLIANCES CORPORATION, OF NEW YORK, N. Y., A CORPORATION OF DELAWARE

SHACKLE

Application filed November 3, 1927. Serial No. 230,698.

The present invention relates generally to devices for absorbing, relieving or otherwise lessening shocks transmitted to the body of a vehicle under running conditions, and relates more particularly to an element forming a cushioning shackle or connection between the ends of a vehicle spring and the chassis or running gear frame.

Some of the objects of the present invention are to provide an improved shackle for motor vehicles and the like; to provide a shackle forming a non-metallic connection between the vehicle springs and vehicle frame; to provide a cushioning device so arranged and constructed as to maintain a non-sway or non-side to side relation between the spring of a vehicle and the frame of a vehicle while allowing relative movement lengthwise of the vehicle whereby the transmission of road shocks to the vehicle body is reduced to a minimum; to provide a device formed of resilient material which is small, compact and efficient as both a fastening for a spring end and a shock relieving element; to provide a novel method of forming a shock absorbing unit; and to provide other improvements as will hereinafter appear.

Figure 1:
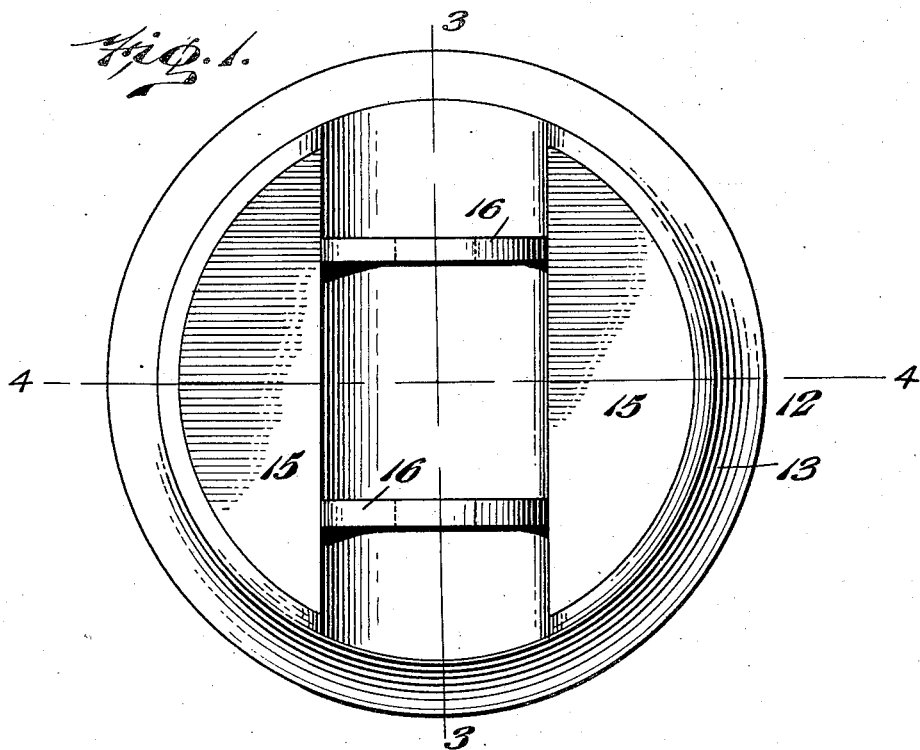
Figure 2:
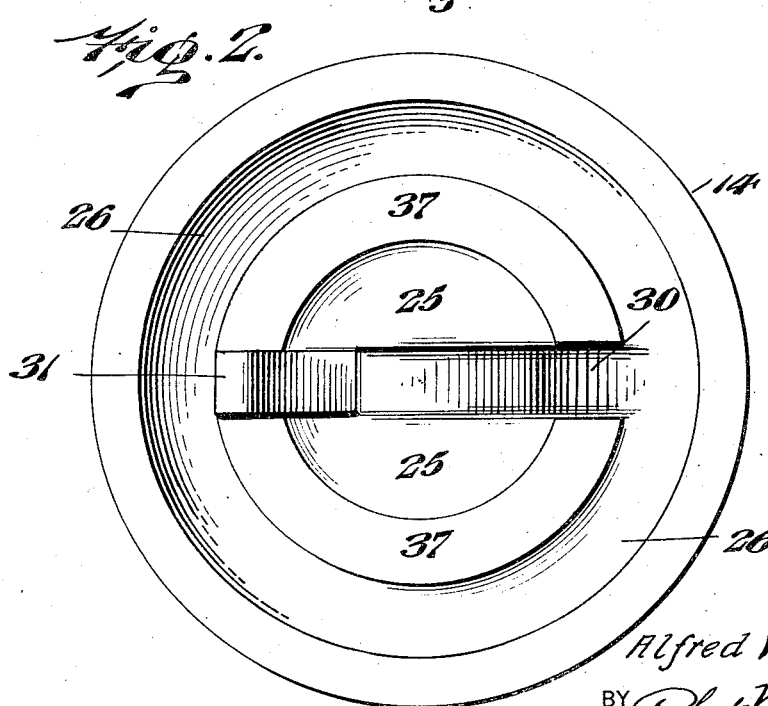

In the accompanying drawings, Fig. 1 represents a plan of a resilient spring connecting element embodying one form of the present invention; Fig. 2 represents a face of one-half of the unit of Fig. 1 prior to final molding; Fig. 3 represents a section on line 3—3 of Fig. 1 in assembled relation; and Fig. 4 represents a section on line 4—4 of Fig. 1 showing also the assembled position of the vehicle spring and frame.

Referring to the drawings and more particularly to Fig. 4 thereof, one form of the present invention is shown as mounted in its operating position between an end of a vehicle spring 10 and an end of a side frame bar 11, and comprises a resilient body 12 preferably formed of rubber impregnated material molded into a unitary disc-like structure from two molded portions 13 and 14 jointed, as here shown on the line A—A. In the present instance, each molded part is one-half of the whole and the two halves are complemental.

For reinforcing the body 12 and also providing rigid fastening means for the parts to be attached thereto, the body portion 13 has a metal end plate 15 molded transversely thereof having two apertured ears 16 projecting endwise therefrom and spaced to receive the eye end of the spring 10. This plate 15 is formed with an arc-shaped seat 17 conforming to the radius of the eye 18 of the spring 10 so that in assembled condition the eye 18 has a relatively large bearing surface in the seat for thrust purposes. Also by the deep formation of the seat 17, the overall thickness of the body 12 is kept to a minimum dimension. Likewise a plate 20 of similar shape is molded into the body portion 14 and has protruding apertured ears 21 and a seat 22 for receiving the eye 23 of the frame bar 11. The two seats 17 and 22 are arranged one above the other but the thickness of the resilient material in which each is embedded is such as to leave a clearance 24 when the body 12 is under external pressure other than that due to the weight supported by the springs 10. Thus this clearance 24 forms a central chamber 25 which allows movement of one portion of the body with respect to the other portion within limits.

As an aid to flexibility and relative movement of the portions of the body 12, each body portion 13 and 14 is annularly channeled symmetrically with respect to the other so that when superposed and molded as a unit the channels provide an inner circumferential chamber 26 bounded by a sturdy outer wall having the desired flexibility and strength.

As a means to prevent side sway or movement of one portion of the body with respect to the other in a plane transverse to the common plane of the spring 10 and frame bar 11, the plate 15 is provided at one side with an integral fin 27, which has a length extending beyond the face of the material molded about it and well within the opposite body part 14 but leaving a clearance space 28 between it and the opposed inner wall of the said part 14. The part 14 opposite to the fin 27 is molded with a groove 30 of a size to snugly receive the fin 27 when the parts are fitted together and thus the fin 27 is held against side movement but is free to move within the limits of the clearance 28 under pressure tending to compress the body 12. Similarly, the plate 20 is formed with a fin 31 projecting toward and snugly seating in a groove 32 prepared in the body part 13 with a clearance 33 for relative movement as above explained. When assembled, the fins 27 and 31 and grooves 30 and 33 lie in the same transverse axial plane, thus conserving space while giving maximum resistance to the undesired lateral pressures. Also the groove 30 provides a communication between the central chamber 25 and the annular chamber 26, whereby an enclosed lubricating fluid 34, such as glycerine and graphite can have access to all parts of the interior of the body 12.

Since one of the features of the present invention is the provision of a construction which translates a compression shock into a thrust or lateral absorption, the internal annularly arranged meeting faces 35 and 36 are not united by molding but are left as relatively movable contact faces and to reduce friction and lessen wear, one of these faces is provided with a plate 37 of brass or other suitable material so that sliding movement takes place between a rubberized fabric face and a metal face.

In fastening the respective spring and bar ends 18 and 23, provision is made for rigidly clamping the parts between the pairs of ears 16 and 21 by fastening bolts 38 which pass through the parts to be connected and are drawn tight to prevent pivotal action of the absorbing element with either the spring 10 or the bar 11. To further minimize the occurrence of such movement, a means is provided, consisting in the present instance of a washer 40, having a toothed face 41, interposed and clamped between each ear and the adjacent part. Thus the eye 18 is clamped between two washers 40 with faces 41 biting into the ears 16, and the eye 23 is clamped between two washers 40 with faces 41 biting into the ears 21, the entire assembly being such as to resist and prevent relative turning of the eyes 18 in the seats 17 and 22. This construction ensures the body part 14 being held against angular displacement under thrust transmitted by the spring 10 and provides a substantial non-metallic terminal for the frame bar 11. On the other hand, the body part 13 can move with the spring 10 as the latter elongates under compression, such movement being curtailed and controlled by the elasticity of the body 12 and the friction between the faces 35 and 36, one of which slides upon the other. Thus resistance to the action of the spring 10 is met not by a vertical force opposing collapse of the body 10 but by a force transverse to the vertical whereby shock absorption is supplemented by a snubbing effect which effects a material increase in efficiency.

In connection with the channelled or hollow portions of the body which contain the liquid lubricant 34, it should be noted that the air trapped therein during the molding together of the body parts 12 is under a pressure predetermined to give added resistance to the body and assist it to function as an efficient shock absorbing shackle connection.

Having thus described my invention, I claim:

1. The combination of a spring, a vehicle frame, and a cushioning device, said device comprising a resilient body having internal resilient body face portions in slidable contact relation, and means for connecting opposite ends of said body respectively to said spring and frame.

2. The combination of a spring, a vehicle frame, and a cushioning device, said device comprising a resilient body having internal resilient body face portions in slidable face to face relation, a metal plate secured to one of said faces, and means for connecting opposite ends of said body respectively to said spring and frame.

3. The combination of a spring, a vehicle frame, and a cushioning device, said device comprising a resilient body having internal resilient body face portions in slidable contact relation and forming an internal chamber, a lubricant in said chamber, and means for connecting opposite ends of said body respectively to said spring and frame.

4. The combination of a spring, a vehicle frame, and a cushioning device, said device comprising a resilient body having two opposed resilient body faces in transverse sliding relation, means for connecting the part having one face to said spring, and means for connecting the part having the other face to said frame.

5. A shock absorbing device arranged to be interposed between two relatively movable parts comprising a resilient body having an annular outer wall and an internal split portion forming a chamber therebetween, a metal plate forming one face of said split portion and arranged in contact with the other face of said portion, said wall and split portion forming an enclosed chamber, and means for connecting opposite ends to said parts respectively whereby thrust of one of said parts causes one face of said split portion to slide on the other face thereof.

6. A shock absorbing device comprising a body formed by a resilient outer wall and two inner parts relatively movable at an angle to forces tending to compress said body axially, and means respectively connecting opposite ends of said body to a fixed part and to a movable part.

7. A shock absorbing device comprising a body formed by a resilient outer wall and two inner parts integral with said wall and relatively movable, means to confine the movement of said parts to one plane, and means respectively connecting opposite ends of said body to a fixed part and to a movable part.

8. A shock absorbing device comprising a body formed by a resilient outer wall and two inner parts integral with said wall and relatively movable, a reinforcing plate molded into one end of said body having a seat to receive the eye of a spring, ears on said plate arranged to straddle said eye, means forming a fixed connection between said eye and said ears, a reinforcing plate molded into the other end of said body having a seat to receive the eye of a frame bar, ears on said plate arranged to straddle said frame eye, and means forming a fixed connection between said frame eye and said last mentioned ears.

9. A shock absorbing device arranged to be interposed between two relatively movable parts comprising a resilient body having an annular outer wall and an internal portion split transversely with respect to a compressive force applied axially of said outer wall, and means for respectively connecting said split portions to said relatively movable parts.

10. A shock absorbing device arranged to to be interposed between two relatively movable parts comprising a resilient body having an annular outer wall connected transversely by two webs arranged for relative sliding movement, and means to confine said sliding movement to a single path of travel.

Signed at Philadelphia, county of Philadelphia, State of Pennsylvania, this 14th day of October, 1927.

ALFRED WEILAND.